United States Patent
Cymbal

[19]

[11] Patent Number: 5,617,763
[45] Date of Patent: Apr. 8, 1997

[54] STEERING WHEEL FOR MOTOR VEHICLE

[75] Inventor: William D. Cymbal, Freeland, Mich.

[73] Assignee: General Motors Corporation, Detroit, Mich.

[21] Appl. No.: 562,530

[22] Filed: Nov. 24, 1995

[51] Int. Cl.[6] ............................. B62D 1/04; G05G 1/10
[52] U.S. Cl. ........................ 74/552; 403/7; 403/378
[58] Field of Search ..................... 74/552; 403/355, 403/374, 378, 379, 7, 8; 29/464, 453, 468, 525.02, 525.04, 525.11, 525.12, 525.13, 525.15

[56] References Cited

U.S. PATENT DOCUMENTS

| | | | |
|---|---|---|---|
| 1,438,004 | 12/1922 | Vincent. | |
| 1,600,456 | 9/1926 | Diekmann. | |
| 1,640,763 | 8/1927 | Geyer et al. | |
| 1,862,859 | 6/1932 | Michel. | |
| 1,879,936 | 9/1932 | Ivandick. | |
| 3,572,197 | 3/1971 | Ortlieb | 82/36 |
| 3,815,928 | 6/1974 | Komori | 279/1 B |
| 4,087,139 | 5/1978 | Heaney | 403/7 X |
| 4,372,703 | 2/1983 | Szostak | 403/378 X |
| 4,416,561 | 11/1983 | Fischer | 403/8 |
| 4,884,469 | 12/1989 | Wrigley | 74/552 |
| 5,144,861 | 9/1992 | Nishijima et al. | 74/552 |
| 5,536,106 | 7/1996 | Landis et al. | 74/552 X |

FOREIGN PATENT DOCUMENTS

| | | | |
|---|---|---|---|
| 2608232 | 6/1988 | France | 74/552 |
| 191223 | 1/1923 | United Kingdom. | |
| 655837 | 8/1951 | United Kingdom | 74/552 |

Primary Examiner—Charles A. Marmor
Assistant Examiner—Saul Rodriguez
Attorney, Agent, or Firm—Saul Schwartz

[57] ABSTRACT

A motor vehicle steering wheel including a hub, a longitudinal bore in the hub which receives a distal end of a steering shaft, a lateral bore in the hub which intersects the longitudinal bore, a cross bolt, and a plastic sleeve on a plastic shroud on the steering wheel which secures the cross bolt in a temporary position to the steering wheel. The plastic sleeve resiliently grips a screw-threaded barrel of the cross bolt and a pilot of the cross bolt partially obstructs the longitudinal bore in hub. The distal end of the steering shaft cams aside the pilot when the distal end is inserted in the longitudinal bore. The connection of the plastic sleeve to the shroud snaps the pilot of the cross bolt into a lateral notch in the distal end of the steering shaft to signal complete penetration of the distal end into the longitudinal bore in the hub. When the cross bolt is thereafter expelled from the plastic sleeve and screwed into the lateral bore in the hub, the plastic sleeve traps the cross bolt in the lateral bore to prevent unintended dislodgment of the cross bolt from the hub.

3 Claims, 5 Drawing Sheets

5,617,763

STEERING WHEEL FOR MOTOR VEHICLE

FIELD OF THE INVENTION

This invention relates to motor vehicle steering wheels.

BACKGROUND OF THE INVENTION

A motor vehicle steering wheel described in U.S. patent application Ser. No. 08/420,162, filed 11 Apr. 1995 and assigned to the assignee of this invention, is retained on a distal end of a steering shaft by a cross bolt which is screwed into a lateral bore in a metal hub of the steering wheel and which seats in a lateral notch in the distal end of the steering wheel. While such steering wheel is easier to install on the steering shaft than prior steering wheels, separate handling and transportation of the cross bolts complicates vehicle final assembly logistics.

SUMMARY OF THE INVENTION

This invention is a new and improved motor vehicle steering wheel including a hub, a longitudinal bore in the hub which receives a distal end of a steering shaft, a lateral bore in the hub which intersects the longitudinal bore, a lateral notch in the distal end of the steering shaft which is aligned with the lateral bore in the hub, a cross bolt, and a plastic sleeve on a shroud wall of the steering wheel which secures the cross bolt in a temporary position to the steering wheel for transport as a unit with the latter. In the temporary position of the cross bolt, the plastic sleeve resiliently grips a screw-threaded barrel of the cross bolt and a pilot end of the cross bolt partially obstructs the longitudinal bore in hub. The steering wheel is mounted on the steering shaft by inserting the distal end of the steering shaft into the longitudinal bore in the hub. The distal end of the steering shaft cams aside the pilot end of the cross bolt which thereafter snaps back into the lateral notch to signal complete penetration of the distal end of the steering shaft in the longitudinal bore in the hub. When the cross bolt is thereafter expelled from the plastic sleeve and screwed into the lateral bore in the hub, the plastic sleeve shrinks to trap the cross bolt in the lateral bore.

DESCRIPTION OF A PREFERRED EMBODIMENT

Figure 1:
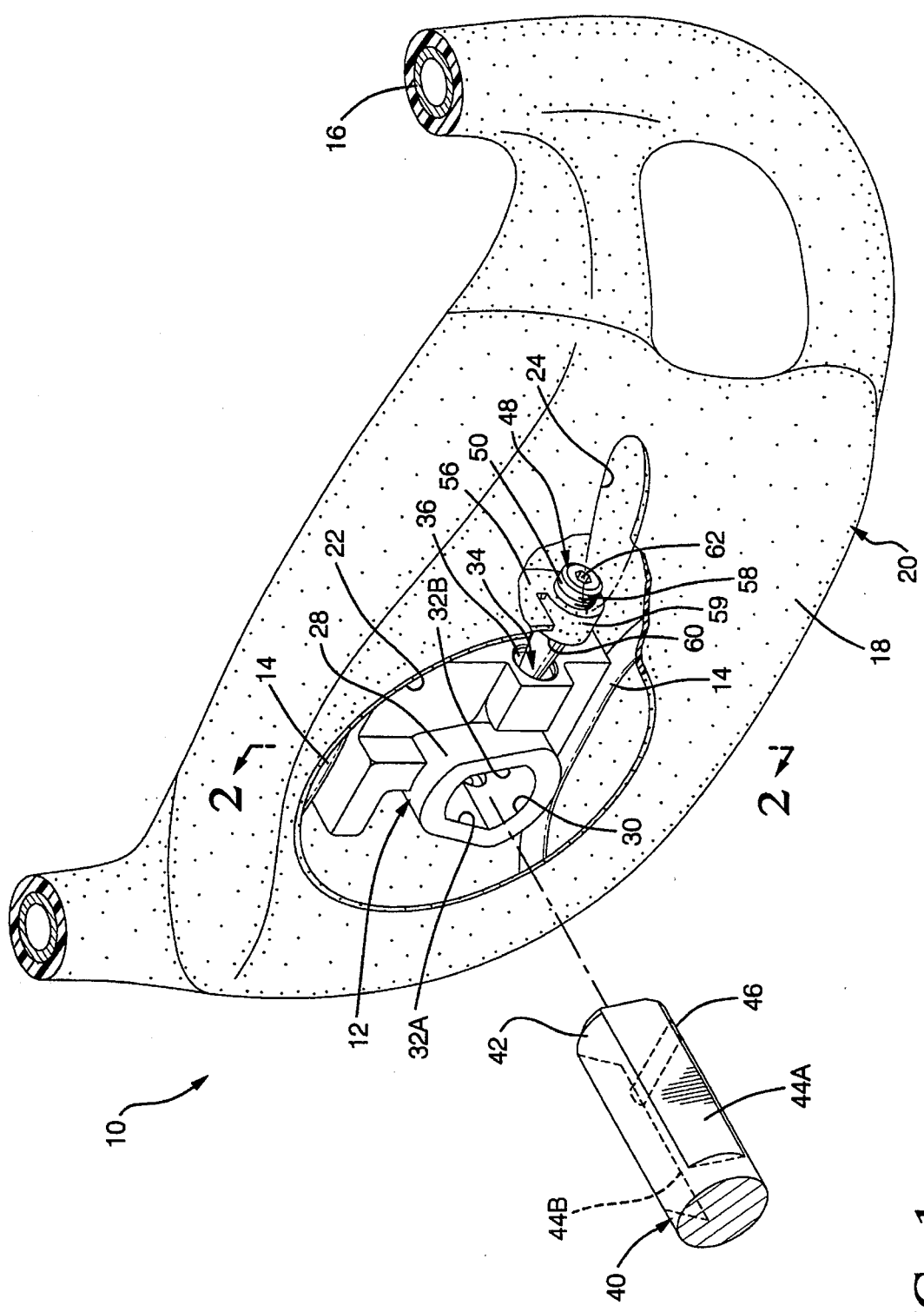
FIG. 1 is a fragmentary, partially broken-away, perspective view of a motor vehicle steering wheel according to this invention.

Referring to FIG. 1, a motor vehicle steering wheel 10 according to this invention includes a metal hub 12, a plurality of structural metal spokes 14 welded to metal hub, and a circular rim 16 welded to the spokes. A back side 18 of the steering wheel is covered by a plastic, thin-wall shroud 20 having a circular opening 22 through which the metal hub 12 is exposed and a lateral access opening 24 facing a side of the metal hub.

Figure 2:
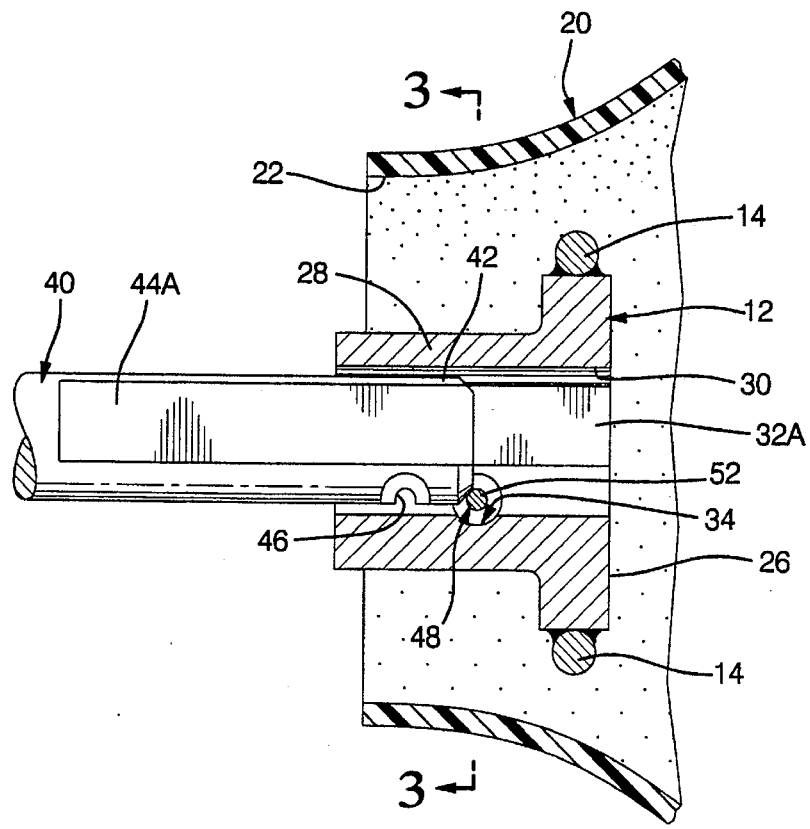
FIG. 2 is a sectional view taken generally along the plane indicated by lines 2—2 in FIG. 1.
Figure 3:
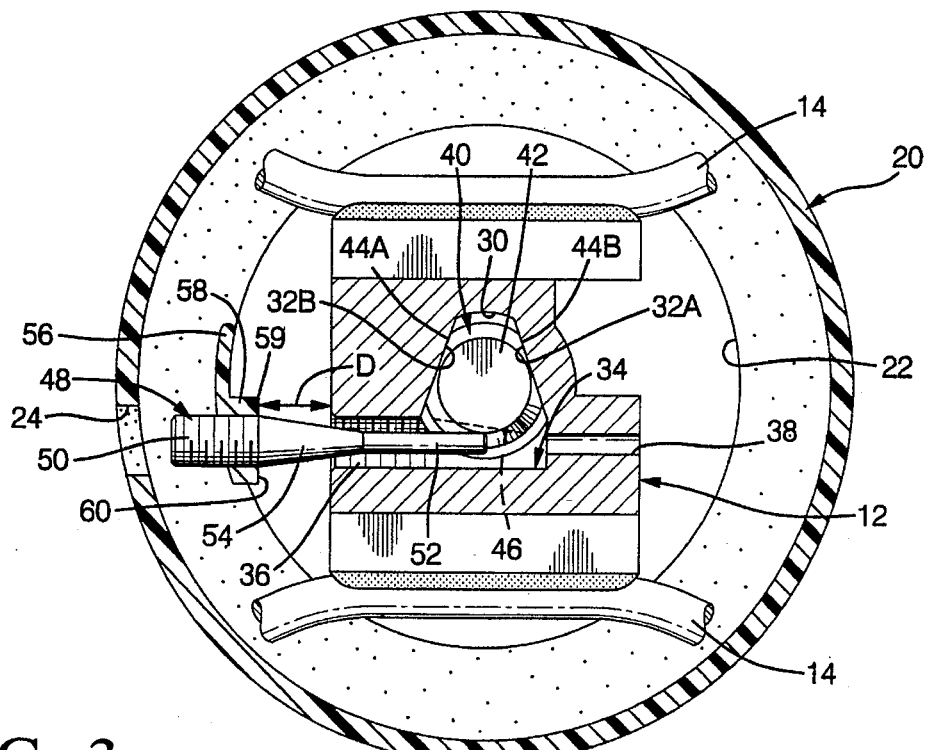
FIG. 3 is a sectional view taken generally along the plane indicated by lines 3—3 in FIG. 2.

As seen best in FIGS. 1–3, the metal hub 12 has a planar front side 26 and a tubular boss 28 generally perpendicular to the front side. A cylindrical longitudinal bore 30 in the hub extends through the tubular boss 28 and intersects the front side 26. The longitudinal bore 30 is interrupted internally by a pair of V-shaped flat sides 32A–32B which traverse the length of the bore. A lateral bore 34 in the hub 12 intersects the longitudinal bore 30 and includes a screw-threaded end 36 on one side of the longitudinal bore 30 and a smaller diameter plain end 38 on the other side of the longitudinal bore. The lateral bore 34 crosses the longitudinal bore 30 generally where the space between the flat sides 32A–32B is maximum.

A steering shaft 40 is rotatably supported on a steering column, not shown, of the motor vehicle and includes a cylindrical distal end 42. The cylindrical distal end 42 is interrupted by a pair of V-shaped flat sides 44A–44B which converge at about the same angle as the flat sides 32A–32B in the longitudinal bore 30 in the hub. The distal end 42 of the steering shaft 40 is further interrupted by a lateral notch 46 which extends across the shaft where the separation between the flat sides 44A–44B is maximum and which defines a segment of a frustoconical surface of revolution.

The steering wheel 10 is mounted on the steering shaft 40 by inserting the distal end 42 of the steering shaft into the longitudinal bore 30 in the hub 12 until the lateral bore 34 in the hub registers with the lateral notch 46 in the distal end of the steering shaft. A cross bolt 48 in the lateral bore 34 has a screw-threaded barrel 50 in the screw-threaded end 36 of the lateral bore 34, a smaller diameter pilot 52 closely received in the plain end 38 of the lateral bore 34, and a frustoconical body 54 between the barrel 50 and the pilot 52 seated in the lateral notch 46 in the distal end 42 of the steering shaft 40. The frustoconical body 54 of the cross bolt 48 interferes with the lateral notch 46 to positively prevent dislodgment of the hub 12 from the distal end of the steering shaft.

As seen best in FIGS. 1 and 3, a small flange 56 integral with the thin-wall shroud 20 is disposed inside the shroud between the metal hub 12 and the lateral access opening 24. The flange 56 has an integral plastic sleeve 58 formed thereon which is universally flexible relative to the plane of the flange and which is self-biased to a center position, FIGS. 1, 3, 7 and 9, perpendicular to the flange and aligned with the lateral bore 34 in the hub. The sleeve 58 includes a tubular wall 59 which terminates at an annular end 60 separated by a predetermined span dimension "D" from the hub. The diameter of the tubular wall 59 is less than the diameter of the screw-threaded barrel 50 of the cross bolt 48.

At the facility where the steering wheel 10 is manufactured, the cross bolt 48 is installed on the steering wheel by inserting the pilot 52 into the lateral bore 34 through the access opening 24 and forcing the screw-threaded barrel 50 of the cross bolt into an interference fit in the sleeve 58 by stretching the sleeve over the screw-threaded barrel, FIGS. 1–3. The sleeve 58 grips the screw-threaded barrel 50 and resiliently retains the cross bolt in a temporary position on the steering wheel, FIGS. 1–3, in which the cross bolt is centered in the lateral bore 34 with the pilot 52 partially obstructing the longitudinal bore 30 in the hub. In its temporary position, the cross bolt 48 is handled and transported as a unit with the steering wheel thereby to avoid the aforesaid logistical disadvantages associated with separate transportation of cross bolts to a remote final assembly site where the steering wheel 10 is mounted on the steering shaft 40.

Figure 4:
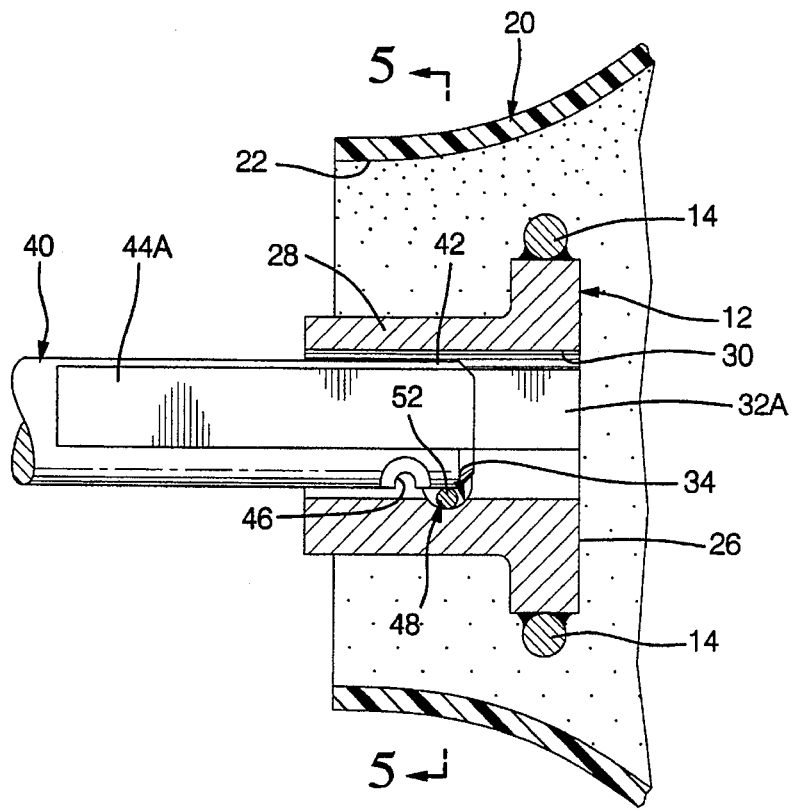
FIG. 4 is similar to FIG. 2 showing elements of the steering wheel according to this invention in different positions.
Figure 5:
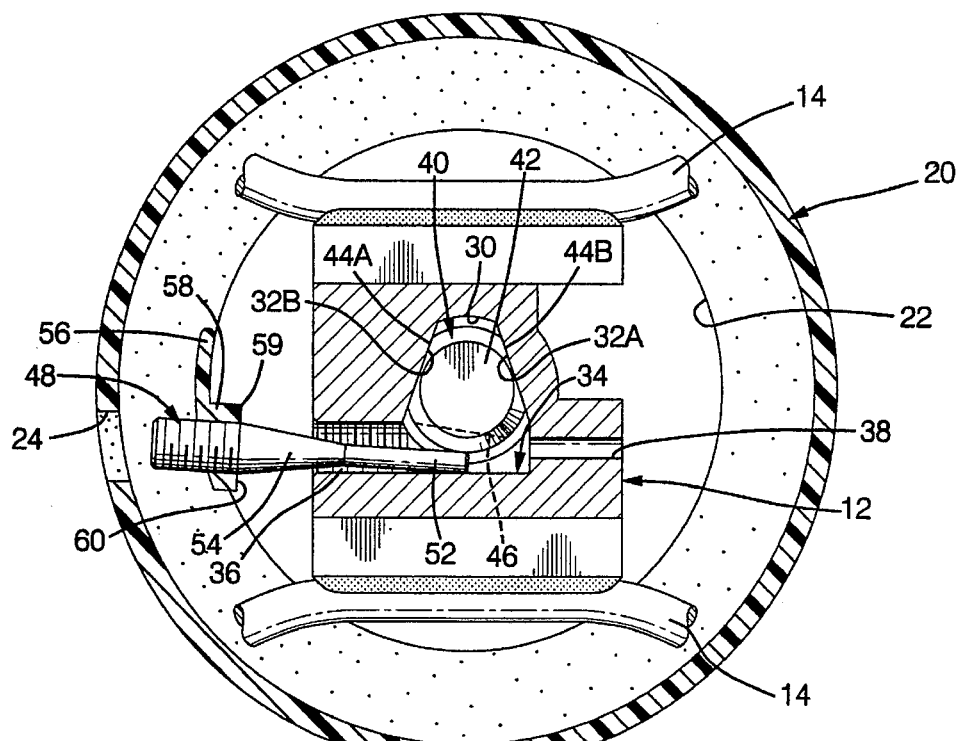
FIG. 5 is a sectional view taken generally along the plane indicated by lines 5—5 in FIG. 4.
Figure 6:
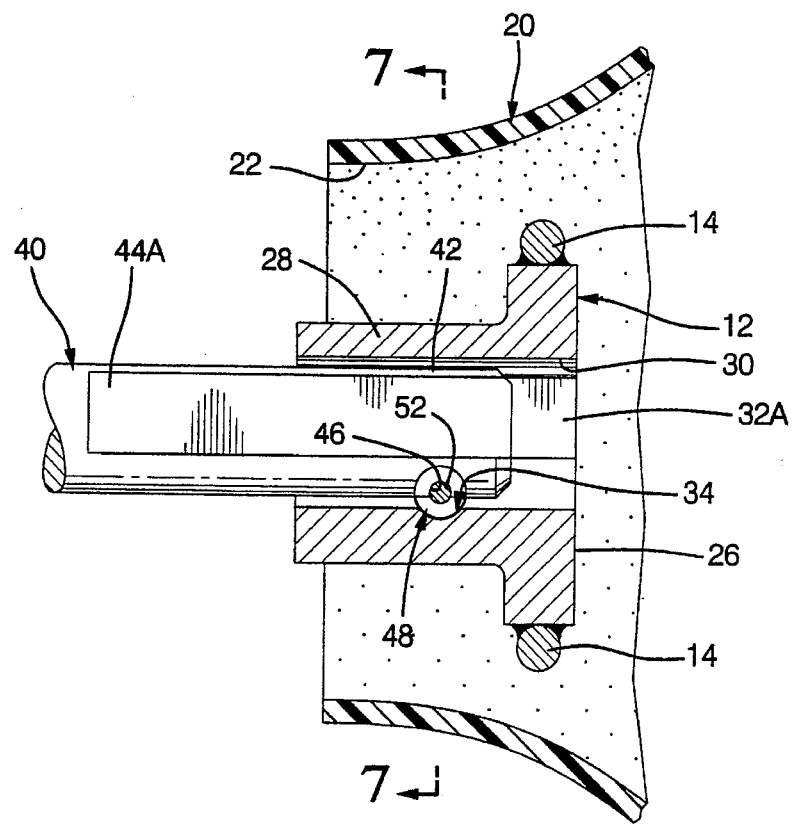
FIG. 6 is similar to FIG. 2 showing elements of the steering wheel according to this invention in further different positions.
Figure 7:
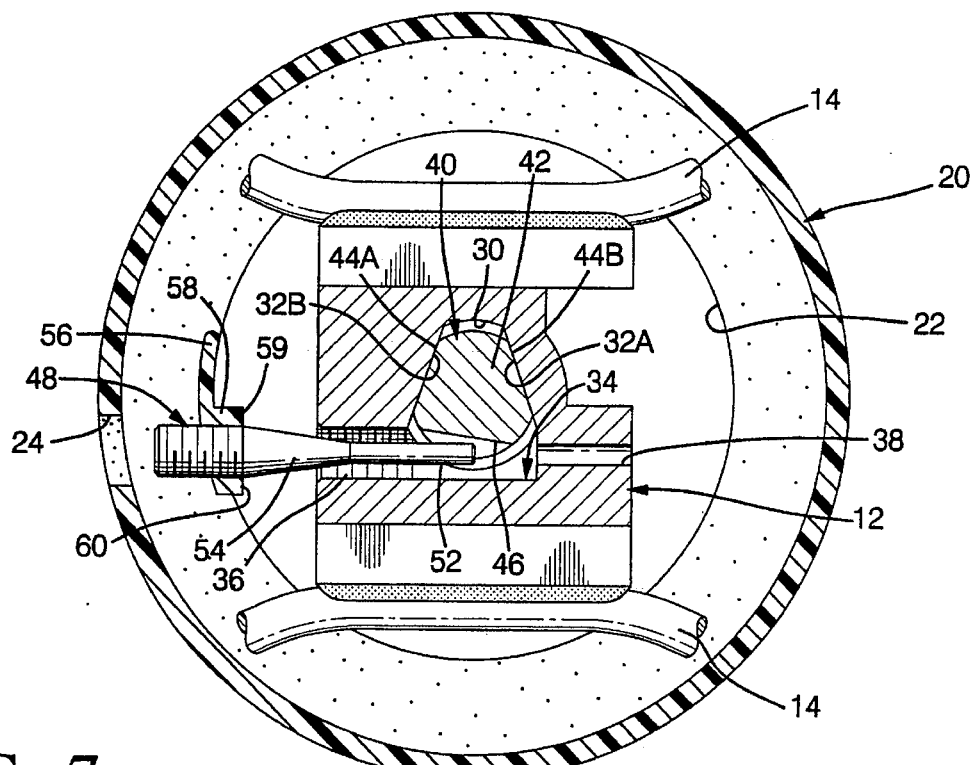
FIG. 7 is a sectional view taken generally along the plane indicated by lines 7—7 in FIG. 6.

At the remote final assembly site, the steering wheel 10 is mounted on the steering shaft 40 by inserting the distal end 42 of the steering shaft through the circular opening 22 in the shroud 20 into the longitudinal bore 30 in the hub. As the distal end 42 of the steering shaft approaches full penetration in the longitudinal bore 30 in the hub, FIGS. 2–3, the distal end 42 of the steering shaft engages the pilot 52 of the cross bolt 48 and pushes or cams the cross bolt aside, i.e., out of its center position, FIGS. 4–5, against the resilient bias of the flexible joint between the sleeve 58 and the flange 56 on the shroud 20. Thereafter, when the lateral notch 46 in the distal end of the steering shaft achieves alignment with the lateral bore 34 in the hub, the resilient bias on the sleeve 58 snaps the cross bolt back to the center position and the pilot 52 into the lateral notch 46, FIGS. 6–7, to afford a tactile and/or audible signal that the distal end of the steering shaft has achieved full penetration in the longitudinal bore 30.

Figure 8:
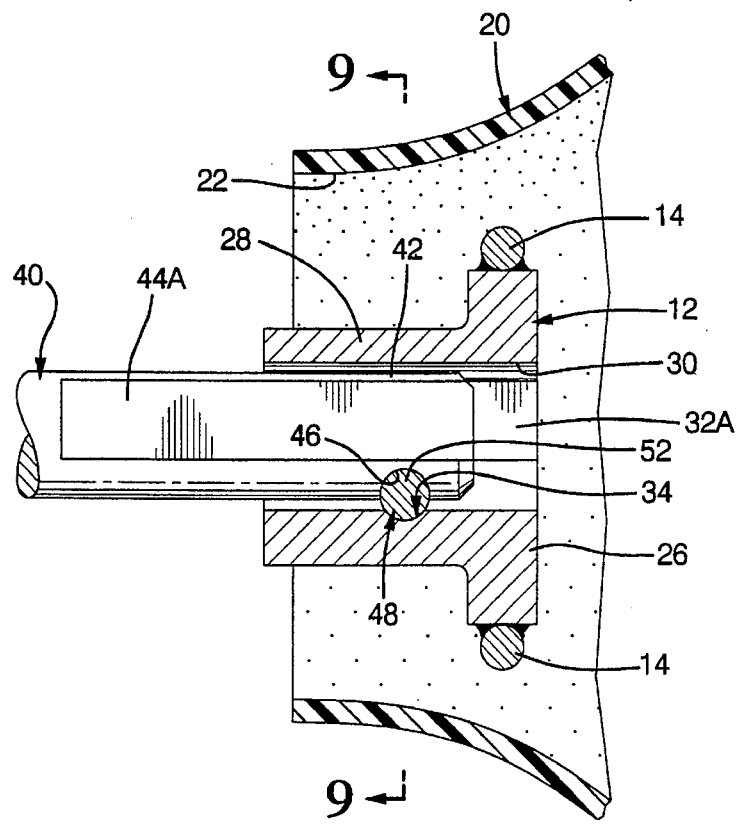
FIG. 8 is similar to FIG. 2 showing elements of the steering wheel according to this invention in further different positions.
Figure 9:
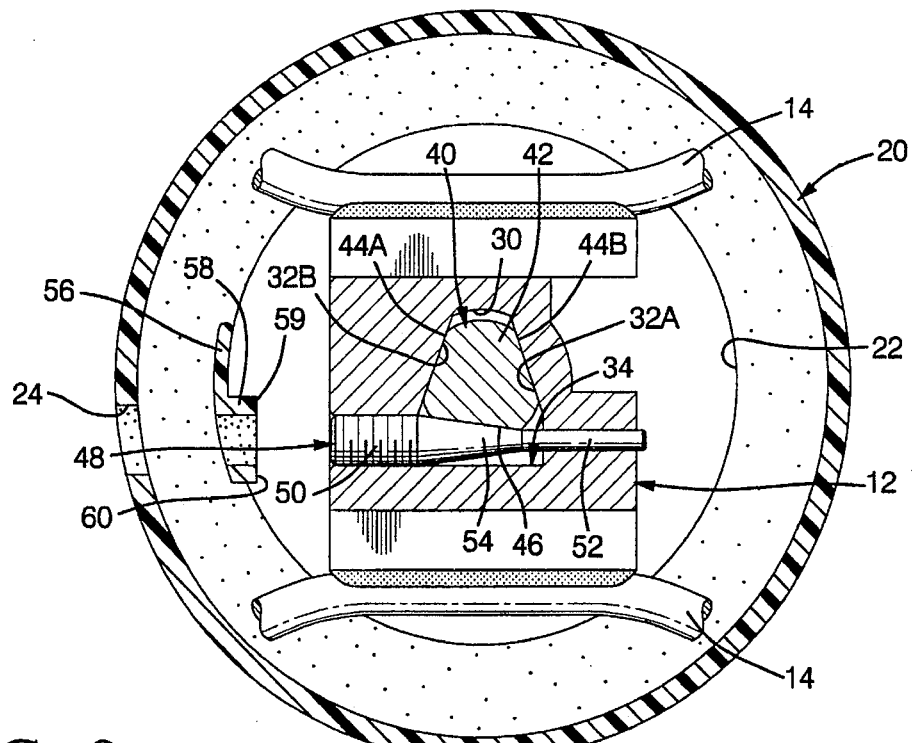
FIG. 9 is a sectional view taken generally along the plane indicated by lines 9—9 in FIG. 8.

A tool, not shown, is then inserted into a socket 62, FIG. 1, in the cross bolt 48 through the lateral access opening 24 in the shroud 20 and rotated to expel the screw-threaded barrel 50 of the cross bolt from the sleeve 58 and into the screw-threaded end 36 of the lateral bore 34. Thereafter, continued rotation of the cross bolt advances the cross bolt into the lateral bore 34 until the distal end 42 of the steering shaft 40 is wedged between the frustoconical body 54 of the cross bolt and the V-shaped flat sides 32A–32B of the longitudinal bore 30 in the hub, FIGS. 8–9.

After the cross bolt 48 is expelled from the plastic sleeve 58, the sleeve shrinks to its unstretched diameter less than the diameter of the screw-threaded barrel of the cross bolt. The span dimension "D" between the hub 12 and the sleeve 58 is calculated to position the annular end 60 of the tubular wall 59 close enough to the hub to positively block withdrawal of the cross bolt from the lateral bore 34 before the pilot 52 withdraws from the plain end 38 of the lateral bore so that positive retention of the hub 12 on the distal end 40 of the steering shaft is assured even if the cross bolt 48 becomes loose.

I claim:

1. A motor vehicle steering wheel including a hub, a longitudinal bore in said hub, a lateral bore in said hub intersecting said longitudinal bore and having a screw-threaded first end on a first side of said longitudinal bore and a second end on a second side of said longitudinal bore, a cross bolt having a screw-threaded barrel and a pilot and a body between said barrel and said pilot, and a plastic thin-wall shroud at least partially concealing said hub, characterized in that said steering wheel further includes a cross bolt retainer comprising:

a plastic sleeve resiliently gripping said screw-threaded barrel of said cross bolt, and a connecting means operative to mount said plastic sleeve on said thin-wall shroud for universal pivotal movement relative to said shroud and to resiliently bias said flexible sleeve to a center position aligned with said lateral bore in said hub so that said cross bolt is supported on said shroud in a temporary position projecting into said lateral bore with said pilot partially obstructing said longitudinal bore in said hub, a distal end of a steering shaft engaging said pilot and camming said cross bolt out of said center position when said distal end is inserted in said longitudinal bore and said connecting means resiliently returning said cross bolt to said center position when a lateral notch in said distal end of said steering shaft registers with said lateral bore in said hub thereby to snap said pilot into said lateral notch to signal complete penetration of said distal end of said steering shaft in said longitudinal bore.

2. The motor vehicle steering wheel recited in claim 1 wherein said connecting means comprises:

a plastic flange integral with each of said thin-wall shroud and said plastic sleeve and perpendicular to said plastic sleeve.

3. The motor vehicle steering wheel recited in claim 2 wherein said plastic sleeve comprises:

a tubular wall having a diameter less than the diameter of said screw-threaded barrel of said cross bolt so that said screw-threaded barrel is resiliently gripped by said sleeve when said tubular wall is resiliently stretched over said screw-threaded barrel, and an annular end separated from said hub by a span dimension calculated to effect interference between said annular end and said cross bolt after said cross bolt is rotated to expel said threaded barrel thereof from said plastic sleeve so that said annular end blocks unintended dislodgment of said cross bolt from said hub.

* * * * *